(12) United States Patent
Xiong

(10) Patent No.: US 10,383,324 B2
(45) Date of Patent: Aug. 20, 2019

(54) FLYSWATTER WITH A REMOVABLE SWATTING PANEL

(71) Applicant: Warren Jibu Xiong, Sammamish, WA (US)

(72) Inventor: Warren Jibu Xiong, Sammamish, WA (US)

( * ) Notice: Subject to any disclaimer, the term of this patent is extended or adjusted under 35 U.S.C. 154(b) by 106 days.

(21) Appl. No.: 15/874,896

(22) Filed: Jan. 19, 2018

(65) Prior Publication Data

US 2019/0223427 A1    Jul. 25, 2019

(51) Int. Cl.
*A01M 3/02* (2006.01)

(52) U.S. Cl.
CPC ....................... *A01M 3/02* (2013.01)

(58) Field of Classification Search
CPC ........................................ A01M 3/02
See application file for complete search history.

(56) References Cited

U.S. PATENT DOCUMENTS

| | | | | |
|---|---|---|---|---|
| 648,794 | A * | 5/1900 | Rice | A01M 3/02 43/137 |
| 1,138,448 | A * | 5/1915 | Brockman | A01M 3/02 43/137 |
| 1,261,222 | A * | 4/1918 | Earles et al. | A01M 3/02 43/137 |
| 1,481,452 | A * | 1/1924 | Woodcock | A01M 3/02 43/137 |
| 1,554,152 | A * | 9/1925 | Williams | A01M 3/02 43/137 |
| 1,590,846 | A * | 6/1926 | Moore | A01M 3/02 43/137 |
| 1,650,548 | A * | 11/1927 | Sullivan | A01M 3/02 43/137 |
| 2,441,290 | A * | 5/1948 | Rimer | A01M 3/02 43/137 |
| 2,651,878 | A * | 9/1953 | Webbeking | A01M 3/02 43/110 |
| 4,120,114 | A * | 10/1978 | Little | A01M 3/02 43/137 |
| 4,510,711 | A * | 4/1985 | Bucek | A01M 3/02 16/110.1 |
| 5,568,699 | A * | 10/1996 | Wadsworth | A01M 3/02 43/137 |
| 2008/0190012 | A1 * | 8/2008 | Chanthalangsy | A01M 3/02 43/137 |

* cited by examiner

*Primary Examiner* — Christopher R Harmon

(57) ABSTRACT

A flyswatter is disclosed which includes a handle split into a top part and a bottom part from a first end to a first predetermined location along an elongated direction of the handle, an elastic band wrapped around the handle at a second predetermined location between the first end and the first predetermined location of the handle, the elastic band urging the top part and the bottom part toward each other, and a perforated swatting panel removably inserted into the handle between the top part and the bottom part, the perforated swatting panel having a first and a second slot cut into an edge thereof accommodating two side portions of the elastic band, respectively.

16 Claims, 2 Drawing Sheets

FLYSWATTER WITH A REMOVABLE SWATTING PANEL

BACKGROUND

The present disclosure relates generally to the field of flyswatters, and, more particularly, to a flyswatter with a replaceable swatter.

House flies are recognized as carriers of easily communicable diseases. People typically use flyswatters to swat house flies. A flyswatter typically includes an elongated handle and a swatting panel at an end of the handle. The swatting panel is typically a perforated flat piece that does not catch much air in a quick motion but can catches a fly in its path or against a surface. However, a shortcoming of the conventional flyswatter is that fly remnants often stick to the swatting panel which can be difficult to clean and itself becomes a source of pathogens. As such what is needed is a flyswatter having an easily removable swatting panel that can be discarded when dirty.

Figure 1:
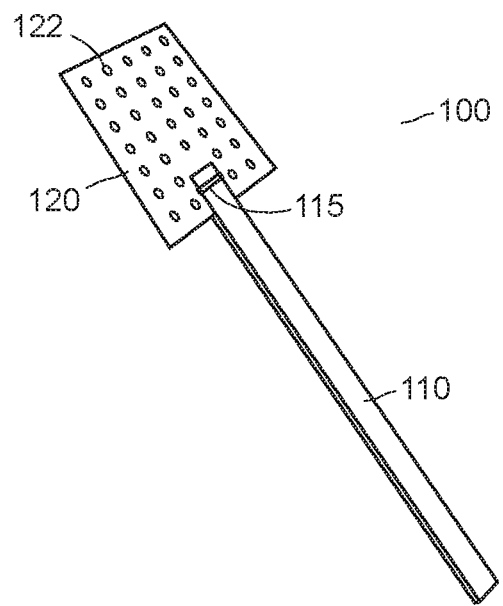
FIG. 1 illustrates a flyswatter in accordance with an embodiment of the present disclosure.

The drawings accompanying and forming part of this specification are included to depict certain aspects of the disclosure. A clearer conception of the disclosure, and of the components and operation of systems provided with the disclosure, will become more readily apparent by referring to the exemplary, and therefore non-limiting, embodiments illustrated in the drawings, wherein like reference numbers (if they occur in more than one view) designate the same elements. The disclosure may be better understood by reference to one or more of these drawings in combination with the description presented herein.

DESCRIPTION

The present disclosure relates to a flyswatter with removable swatting panel. A preferred embodiment of the present disclosure will be described hereinafter with reference to the attached drawings.

FIG. 1 illustrates a flyswatter 100 in accordance with an embodiment of the present disclosure. The flyswatter 100 includes a swatting panel 120 secured to a handle 110 by a rubber band 115. The swatting panel 120 is perforated with many small through holes 122 for passing air when in motion and not missing a fly.

Figure 2:
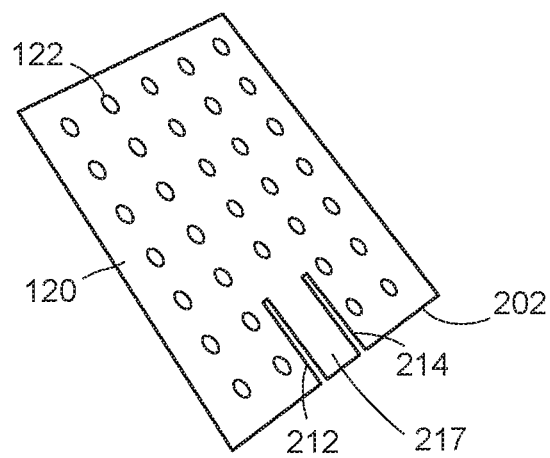
FIG. 2 illustrates more details of the swatting panel shown in FIG. 1.

FIG. 2 illustrates mode details of the swatting panel 120 shown in FIG. 1. In an embodiment, the swatting panel 120 is of a rectangular shape and has two slots 212 and 217 parallel to each other cut into a lower edge 202. The two slots 212 and 217 are approximately perpendicular to the lower edge 202, and leave a tongue piece 217 located at approximately a center of the lower edge. In embodiments, the swatting panel 120 is made of card paper punctured with the through holes 122 and the slots 212 and 214.

Figure 3:
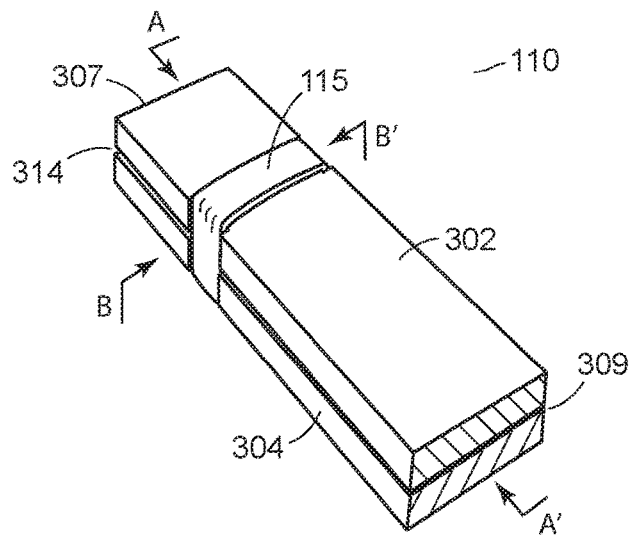
FIG. 3 illustrates an end of the handle for engaging the swatting panel shown in FIG. 1.

FIG. 3 illustrates an end 307 of the handle 110 for engaging the swatting panel 120 shown in FIG. 1. The handle 110 splits into two pieces 302 and 304 from a location 309 to the end 307. The top handle piece 302 and the bottom handle piece 304 are exemplarily urged together by a circular rubber band 115. A gap 314 formed between the two handle pieces 302 and 304 is for accepting the swatting panel 120 of FIGS. 1 and 2.

In embodiments, the top handle piece 302 and the bottom handle piece 304 are identically made of wood, bamboo or plastic and are glued together through majority of the length of the handle 110 except from location 309 to the end 307 for forming the gap 314.

Figure 4A:
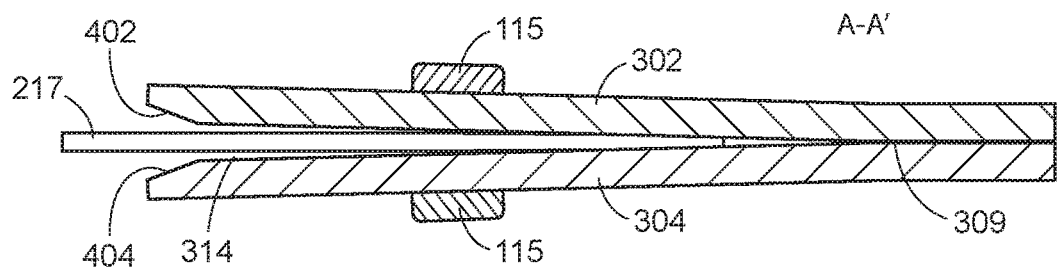
FIGS. 4A and 4B are cross-sections of the swatting panel engaging end of the handle shown in FIG. 3.
Figure 4B:
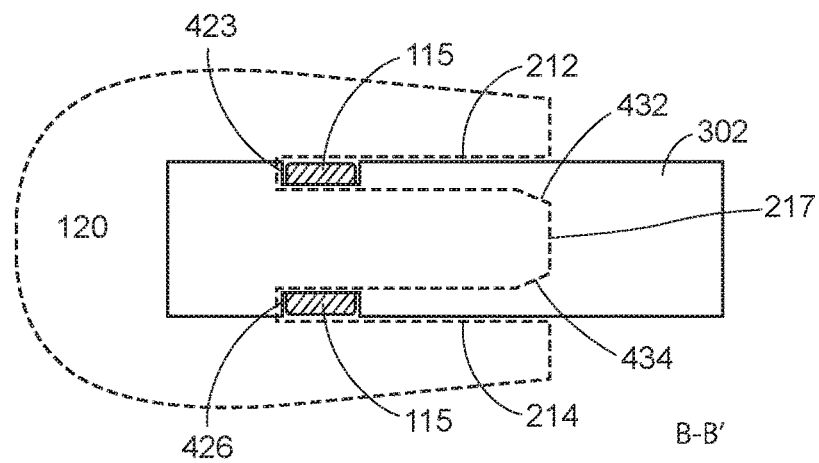

FIGS. 4A and 4B are cross-sections of the swatting panel 120 engaging the handle 110 shown in FIG. 3. The cross-section shown in FIG. 4A is taken along the elongated direction of the handle 110 at location A-A' as shown in FIG. 3. As shown in FIG. 4A, the top handle piece 302 and the bottom handle piece 304 are glued together to the right side of the location 309, and are separated to the left side of the location 309 by the tongue piece 217 of the swatting panel 120 shown in FIG. 2. The rubber band 115 urges the top handle piece 302 and the bottom handle piece 304 onto the tongue piece 217 so that the swatting panel 120 is secured to the handle 110.

As shown in FIG. 4A, the top handle piece 302 exemplarily has a downward facing slope 402 at the end 307, and the bottom handle piece 304 has an upward facing slope 404 at the end 307. The slopes 402 and 404 make inserting the tongue piece 217 into the gap 314 easier.

The cross-section shown in FIG. 4B is taken at a location B-B' in a transverse direction to the elongated direction of the handle 110, wherein only the top handle piece 302 is shown. As shown in FIG. 4B, the top handle 302 has recesses 423 and 426 cut into opposite sides of the handle for receiving the rubber bands 115. The tongue piece 217 snuggly fits into the space between the notches 423 and 426. As shown in FIG. 4B, the slots 212 and the 214 are sized to just accommodate the rubber band 115, so that when the swatting panel 120 are fully inserted in the gap 314, edges of the slots 212 and 214 are positioned next to the opposite sides of the handle 110, respectively. Such arrangement helps to prevent the swatting panel 120 from rotating.

As shown in FIG. 4B, the tongue piece 217 has slanted or curved entry edges 432 and 434 so that the tongue piece 217 can be easily inserted into the gap 314.

Although the disclosure is illustrated and described herein as embodied in one or more specific examples, it is nevertheless not intended to be limited to the details shown, since various modifications and structural changes may be made therein without departing from the spirit of the disclosure and within the scope and range of equivalents of the claims. Accordingly, it is appropriate that the appended claims be construed broadly and in a manner consistent with the scope of the disclosure, as set forth in the following claims.

What is claimed is:

1. A flyswatter comprising:
   a handle split into a top part and a bottom part from a first end to a first predetermined location along an elongated direction of the handle;
   an elastic band wrapped around the handle at a second predetermined location between the first end and the first predetermined location of the handle, the elastic band urging the top part and the bottom part toward each other; and
   a perforated swatting panel removably inserted into the handle between the top part and the bottom part, the perforated swatting panel having a first and a second slot cut into an edge thereof accommodating two side portions of the elastic band, respectively.

2. The flyswatter of claim 1, wherein the handle is made of a material selected from the group consisting of wood, bamboo and plastic.

3. The flyswatter of claim 2, wherein the handle is formed by permanently attaching two elongated parts together between the first predetermined location and a second end of the handle.

4. The flyswatter of claim 3, wherein the two elongated parts are glued together.

5. The flyswatter of claim 1, wherein the handle has recesses on opposite sides thereof to accommodate the side portions of the elastic band, respectively.

6. The flyswatter of claim 1, wherein the top part has a slanted corner surface facing toward the bottom part for easing insertion of the swatting panel.

7. The flyswatter of claim 1, wherein the bottom part has a slanted corner surface facing toward the top part for easing insertion of the swatting panel.

8. The flyswatter of claim 1, wherein the elastic band is a circular rubber band.

9. The flyswatter of claim 1, wherein the edge of the swatting panel is straight.

10. The flyswatter of claim 1, wherein the two slots have approximately the same dimensions.

11. The flyswatter of claim 1, wherein the two slots are parallel to each other.

12. The flyswatter of claim 1, wherein the two slots are symmetrically located on the swatting panel.

13. The flyswatter of claim 1, wherein both the slots are substantially perpendicular to the edge of the swatting panel.

14. The flyswatter of claim 1, wherein an outer edge of either one of the slots is adjacent to a side surface of the handle when the swatting panel is inserted in the handle between the top part and the bottom part.

15. The flyswatter of claim 1, wherein an inner edge of either one of the slots is curved near the edge of the swatting panel leaving a wider entrance to the one of the slots.

16. The flyswatter of claim 1, wherein the swatting panel is made of card paper.

* * * * *